United States Patent

[11] 3,545,707

[72] Inventor Sho Orii
2102-1, Oaza Higashi-Hongo, Kawaguchi-shi, Saitama-Ken, Japan
[21] Appl. No. 767,148
[22] Filed Oct. 14, 1968
[45] Patented Dec. 8, 1970
[32] Priority April 15, 1968
[33] Japan
[31] No. 43-24787

[54] DEVICE FOR SUPPORTING AN OBJECT FOR DISPLACEMENT ON A SUPPORTING SURFACE OR FOR BEING LOCKED AND LEVELED IN POSITION ON THE SUPPORTING SURFACE
10 Claims, 3 Drawing Figs.

[52] U.S. Cl. ............................................. 248/24, 16/32
[51] Int. Cl. ..................................... B60b 33/06; B61i 24/04
[50] Field of Search ......................................... 16/35, 18; 188/1, 5; 254/86; 248/15, 24

[56] References Cited
UNITED STATES PATENTS
| | | | |
|---|---|---|---|
| 3,288,250 | 11/1966 | Oja et al. ................ | 188/5 |
| 2,792,874 | 5/1957 | Sundberg .................. | 188/5 |

Primary Examiner—Bobby R. Gay
Assistant Examiner—Doris L. Troutman
Attorney—Waters, Roditi, Schwartz & Nissen ABSTRACT: A device having a main shaft fixed to an object to be supported and a housing rotatably supported on the main shaft, the main shaft supporting a level adjustment shaft for rotation on a fixed longitudinal position, a bracket being threadably engaged on the level adjustment shaft and engaging the housing so as to move along the level adjustment shaft as the same is rotated in the main shaft, said bracket carrying a friction block which travels therewith and is positioned relative to a rotatable wheel, supported by the housing and resting on a support surface, such that the block can contact the support surface and have the weight of the object shifted thereto from the wheel while the housing is lifted and the wheel is raised from the supporting surface while the object is leveled.

DEVICE FOR SUPPORTING AN OBJECT FOR DISPLACEMENT ON A SUPPORTING SURFACE OR FOR BEING LOCKED AND LEVELED IN POSITION ON THE SUPPORTING SURFACE

BRIEF SUMMARY OF THE INVENTION

The present invention relates to a device which can be attached to a machine or implement or other object for enabling the object to be displaced along a supporting surface or to be locked in position on such supporting surface and adjusted as to level on such surface. In the prior art, the object has, in general, separately mounted thereon supporting wheels for the movement of the machine or implement and means for securing the object in position. Consequently, such object has required excessive space for the supporting wheels, the locking means and a level-adjusting means, and moreover, it is troublesome to mount these separate items on the object.

An object of the present invention is to provide a device which overcomes the above-noted deficiencies.

In accordance with the invention there is provided a combined locking, leveling or displaceable support device for an object which comprises first means for engaging an object to be supported, a housing rotatably mounted on said first means, second means within said housing engaging said first means for relative rotation in a longitudinally fixed position, a bracket supported on said second means and engaged with said housing for undergoing longitudinal travel with respect to said second means and said housing as said second means is rotated, a friction block secured to said bracket for displacement therewith and a wheel rotatably supported in said housing and adapted for contacting a support surface to transport the object therealong, said friction block being positioned relative to said wheel to contact said supporting surface as the second means is rotated in one direction whereby to bear the weight of the object and lift the wheel free from said supporting surface so that the object is now locked in position and raised by an adjustable amount from said supporting surface, rotation of the second means in the opposite direction causing retraction of the friction block into the housing and renewed contact of the wheel with the supporting surface.

DETAILED DESCRIPTION

Figure 1:
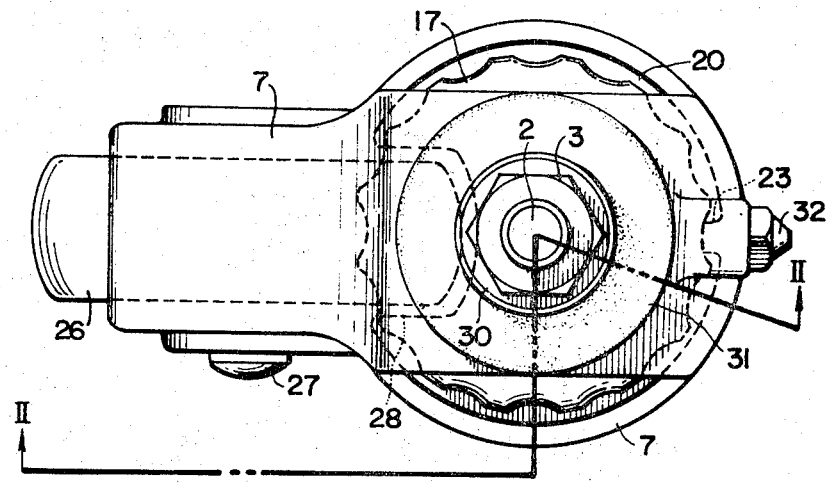
FIG. 1 is a top plan view illustrating one preferred embodiment of a combined shifting and setting device according to the present invention.

Referring now to the drawings, a piece of machinery or like object includes a portion facing a supporting surface for the machinery, i.e. a floor or the like. The portion 1 has a hollow main shaft 4 secured thereon by means of an anchor bolt 2 and a nut 3. An upper thrust bearing 5 and a lower thrust bearing 6 are fitted on the upper and lower extremities of the main shaft 4. Between these upper and lower thrust bearings 5 and 6 is arranged an upper annular flange 8 of a housing 7. Steel balls 9 and a first intermediate thrust bearing 10 are inserted in a space between the upper thrust bearing 5 and the annular flange 8, and steel balls 11 and a second intermediate thrust bearing 12 are inserted in a space between the lower thrust bearing 6 and the annular flange 8. The housing 7 is thus separated for rotational movement about and with respect to the main shaft 4. Numerals 13 and 14 designate O-ring seals each made of oil resistant rubber. The hollow main shaft 4 receives within the lower portion thereof, a solid, level adjustment shaft 15. Shaft 15 is inserted to a given depth in shaft 4 and engaged therewith by means of a stop member 16, such that shaft 15 is rotatable in shaft 4 while being held in axially fixed position therein. On the level adjustment shaft 15 is integrally formed a handwheel 17, the upper surface of which is, in turn, in engagement with the lowest end of the main shaft 4 through a washer 18. The level adjustment shaft 15 is provided at its lower end with an external thread 19 which is engaged with an internal thread 21 of a bracket 20 to which is secured a vibration isolating rubber block 22. The bracket 20 and the rubber block 22 are provided on their outer peripheries with aligned longitudinally extending grooves 23 and 24 which are in engagement with a complementary rib 25 formed on the inner surface of the housing 7, such that the bracket and block are prevented from rotating with respect to the housing while being axially displaceable therealong. Thus, when the level adjustment shaft 15 is rotated by manual operation of the handwheel 17, the bracket 20 and the rubber block 22 will be moved up or down along the level adjustment shaft 15. A supporting wheel 26 is journaled on the housing 7 at a laterally offset position from the main shaft 4. Numeral 27 designates an axle of the wheel 26. The rubber block 22 and its associated bracket 20 are both provided with recessed portions 28 and 29 for receiving therein, with clearance, a portion of the wheel 26. Numerals 30, 31 and 32 designate a washer, a packing member and a grease nipple, respectively.

Figure 3:
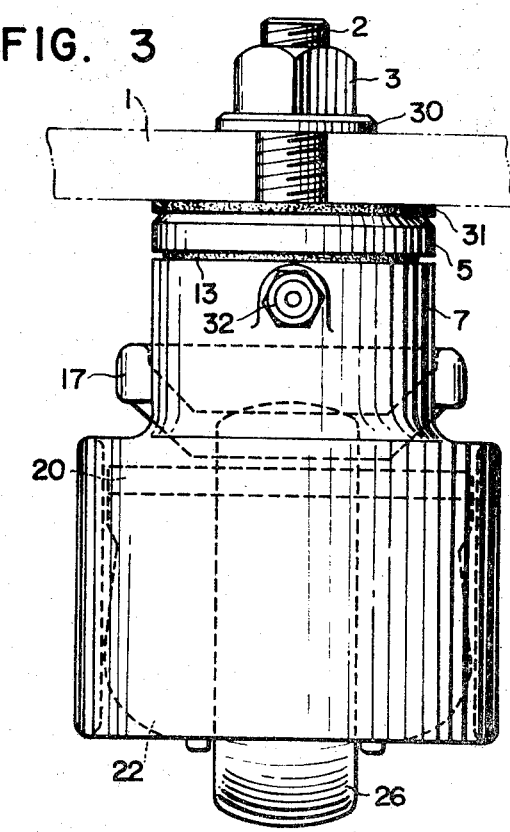
FIG. 3 is a side view of the embodiment of FIG. 1.
Figure 2:
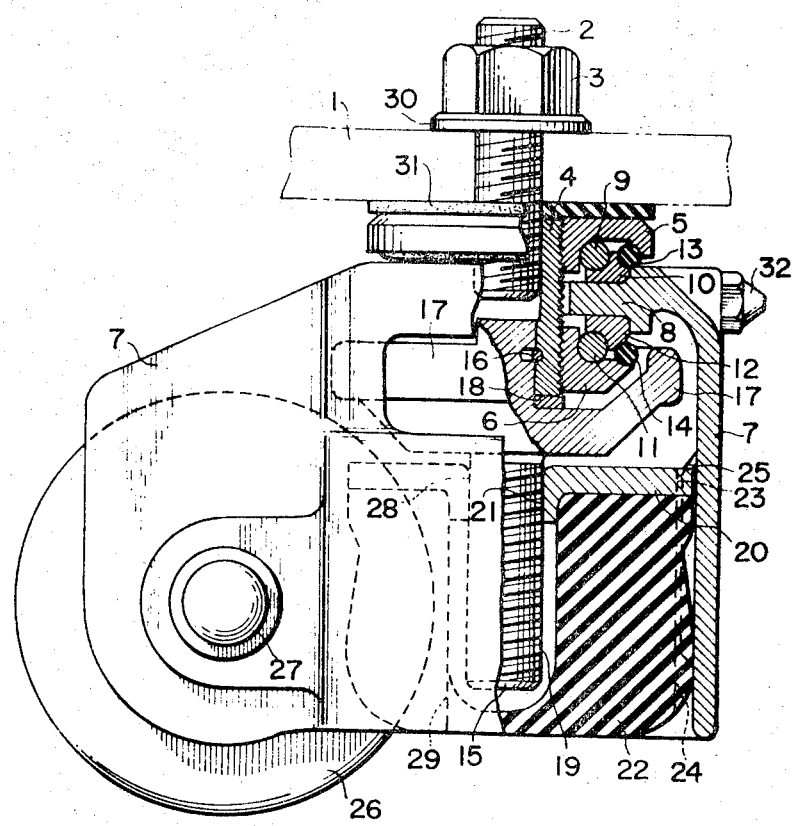
FIG. 2 is a sectional view taken along the line A–A in FIG. 1.

FIGS. 2 and 3 show the condition where the supporting wheel 26 can rest on a supporting surface such as a floor or the like (not shown). In this condition, when the machinery is pushed in the desired direction, the housing 7 may be turned in the intended direction of travel and the machinery may be easily moved or transported to a desired location. Upon arrival of the machinery at its destination, the handwheel 17 is rotated counterclockwise to cause counterclockwise rotation of the level adjustment shaft 15 and consequent vertical movement of the bracket 20 and the rubber block 22 therewith along the axis of the level adjustment shaft 15 until the lower face of the rubber block 22 is brought into contact with the supporting surface. Further counterclockwise rotation of the handwheel 17 causes upward movement of the level adjustment shaft 15 whereby the weight of the machinery is shifted from wheel 26 to block 22. Namely, the weight of the machine applied to main shaft 4, upper thrust bearing metal 5, steel balls 9, intermediate thrust bearing metal 10, housing 7, axle 27 and supporting wheel 26 is shifted to the supporting surface through the system including the main shaft 4, washer 18, handwheel 17, level adjustment shaft 15, bracket 20 and rubber block 22. It will be thus understood that the transmission of machinery vibration to the supporting surface during operation of the machinery will be reduced by means of the vibration isolating rubber block 22, while the frictional engagement of the rubber block 22 with the supporting surface will cause the machinery to be firmly locked in place. It will be also understood that the machinery usually has at least three of the devices mounted thereon in a three point supporting manner, and the machinery may be horizontally leveled by vertical adjustment of the level adjustment shaft 15 with respect to the rubber block 22.

The device according to the present invention has the advantage that it may be easily attached to the machinery since the housing compactly receives therein both the vibration isolating rubber block and the supporting wheel, and the device may be reduced in size since the wheel is arranged at the outside of the rubber block.

I claim:

1. A device for supporting an object for displacement or for being locked and leveled in position, said device comprising first means for engaging an object to be supported, a housing rotatably mounted on said first means, second means within said housing engaging said first means for relative rotation in a longitudinally fixed position, a bracket supported on said second means and engaged with said housing for undergoing longitudinal travel with respect to said second means and said housing as said second means is rotated, a friction block secured to said bracket for displacement therewith, and a wheel rotatably supported in said housing and adapted for contacting a supporting surface to transport the object therealong, said friction block being positioned relative to said wheel to contact said supporting surface as the second means is rotated in one direction whereby to bear the weight of the object and lift the wheel free from said supporting surface so that the object is now locked in position and raised by an adjustable amount from said supporting surface, rotation of the second means in the opposite direction causing retraction of the friction block into the housing and renewed contact of the wheel with the supporting surface.

2. A device as claimed in claim 1 wherein said friction block and bracket have a groove therein, said wheel being received in said groove with clearance.

3. A device as claimed in claim 1 wherein said second means comprises a threaded shaft, said bracket being threadably engaged with said shaft for travel therealong as said second means is rotated.

4. A device as claimed in claim 3 wherein said housing includes an internal rib thereon, said bracket having a groove receiving said rib whereby rotation between the housing and bracket is prevented. 7

5. A device as claimed in claim 4 wherein said friction block has an opening therein receiving said threaded shaft.

6. A device as claimed in claim 1 wherein said second means comprises a handwheel accessible through said housing for rotating said second means.

7. A device as claimed in claim 1 wherein said first means comprises a hollow shaft secured to said object and said second means comprises a stub shaft rotatably mounted within said hollow shaft and means between said shafts for holding the same in longitudinally fixed position while permitting relative rotation therebetween.

8. A device as claimed in claim 7 wherein said hollow shaft is externally threaded and includes a pair of spaced bearing members threadably engaged thereon, said housing including an annular flange interposed between said bearing members and rotatably supported thereby.

9. A device as claimed in claim 1 wherein said friction block is constituted of a resilient material.

10. A device as claimed in claim 1 wherein said second means is rotatable relative to said first means about a vertical axis and said wheel is rotatable in said housing about a horizontal axis which is laterally offset from said vertical axis.